United States Patent [19]
Corver et al.

[11] 3,976,752

[45] Aug. 24, 1976

[54] MANUFACTURE OF WATER-INSOLUBLE AMMONIUM POLYPHOSPHATE

[75] Inventors: Hans A. Corver; Allan J. Robertson, both of St. Catharines, Canada

[73] Assignee: American Cyanamid Company, Stamford, Conn.

[22] Filed: Nov. 18, 1974

[21] Appl. No.: 524,696

[30] Foreign Application Priority Data
July 29, 1974 Canada .................................. 205882

[52] U.S. Cl. .............................. 423/305; 423/315; 71/43
[51] Int. Cl.$^2$ .................... C01B 15/16; C01B 25/26
[58] Field of Search ................ 423/305, 315; 71/43

[56] References Cited
UNITED STATES PATENTS

| | | | |
|---|---|---|---|
| 3,419,349 | 12/1968 | Rohlfs et al. | 423/306 |
| 3,495,937 | 2/1970 | Shen | 423/309 |
| 3,653,821 | 4/1972 | Heyma et al. | 423/305 |
| 3,723,074 | 3/1973 | Sears et al. | 423/305 |

*Primary Examiner*—Oscar R. Veritz
*Assistant Examiner*—Gregory A. Heller
*Attorney, Agent, or Firm*—Frank M. Van Riet

[57] ABSTRACT

A continuous process for preparing crystalline, water-insoluble ammonium polyphosphates of controlled pH utilizing a continuous reaction arena, is disclosed.

4 Claims, 2 Drawing Figures

MANUFACTURE OF WATER-INSOLUBLE AMMONIUM POLYPHOSPHATE

BACKGROUND OF THE INVENTION

The production of ammonium polyphosphates for use as flame-retarding agents, especially in intumescent paints, has materially increased over the past few years. These ammonium polyphosphates range from water-soluble materials, through amorphous glasses, to crystalline, water-insoluble powders and have been produced utilizing a myriad of different procedures.

Ammonium polyphosphates can be represented by the generic formula

wherein $n$ is an integer having an average value greater than 10, m/n is between about 0.7 and about 1.1 and the maximum value of $m$ is equal to $n+2$.

They are generally produced by a variety of different reactions including, but not limited to, those set forth by the following equations wherein APP represents ammonium polyphosphate.

(I) $NH_3 + H_3PO_4 + H_2NCONH_2 \rightarrow$ APP (II) $NH_3 + H_3PO_4 + P_2O_5 \rightarrow$ APP (III) $NH_4OH + NH_3 + POCl_3 \rightarrow$ APP (IV) $H_3PO_4 + H_2NCONH_2 \rightarrow$ APP (V) $(NH_4)_4P_2O_7 + P_2O_5 \rightarrow$ APP These ammonium polyphosphates have been found useful, as mentioned above, as flame-retardant additives in the production of intumescent paints. They also impart flame-retardance to plastics, textiles and the like when incorporated therein.

More recently, it has been found that ammonium polyphosphates in general, and crystalline, water-insoluble ammonium polyphosphates in particular, can advantageously be incorporated into wood particleboard in order to impart flame-retardance thereto. Not only do the crystalline, water-insoluble ammonium polyphosphates impart flame-retardance to the board but they also do so to the same degree as other, more widely used, flame-retardant additives and, in most instances, at lesser concentrations.

In exploring the effects of ammonium polyphosphates upon the flame-retardance of particleboard and in assessing the many different variables which exist in the process of flame-proofing particleboard with polyphosphates, we have discovered that the pH of the ammonium polyphosphate plays an important role. The pH of the polyphosphate, the pH of the resinous glue which is used to bind the wood particles together during heat and pressure consolidation and the pH of the wood particles per se are all important variables which must be considered by the particleboard manufacturer. We have found that if the pHs of the melamine polyphosphate, the resin glue and the wood chips are all substantially identical, i.e. matched to within 0.5 units of one another, not only does the polyphosphate function normally as a flame-retardant but it effects the curing rate of the resinous glue. That is to say, a polyphosphate of too low a pH accelerates the resin cure and thereby results in boards having inferior properties of internal bond, delamination and surface quality, especially with urea-formaldehyde resins, the most widely used resins for glueing in particleboard production. However, since the pH of ammonium polyphosphates tends to fluxuate widely depending upon the starting materials charged and the method used in the production thereof, it became necessary to be able to produce ammonium polyphosphates of a controlled or desired pH since the pH of the wood chips and that of the resin glue in particleboard production are relatively constant.

SUMMARY OF THE INVENTION

Accordingly, we have now discovered a novel process for the production of crystalline, water-insoluble ammonium polyphosphates of a pH ranging from about 4.5–6.5. Our process combines a unique continuous treatment of charge materials with a novel control of the ammonia gas evolved during the ammonium polyphosphate production so as to produce, continuously, crystalline, water-insoluble ammonium polyphosphate having a controlled pH.

DESCRIPTION OF THE INVENTION INCLUDING PREFERRED EMBODIMENTS

Figure 1:
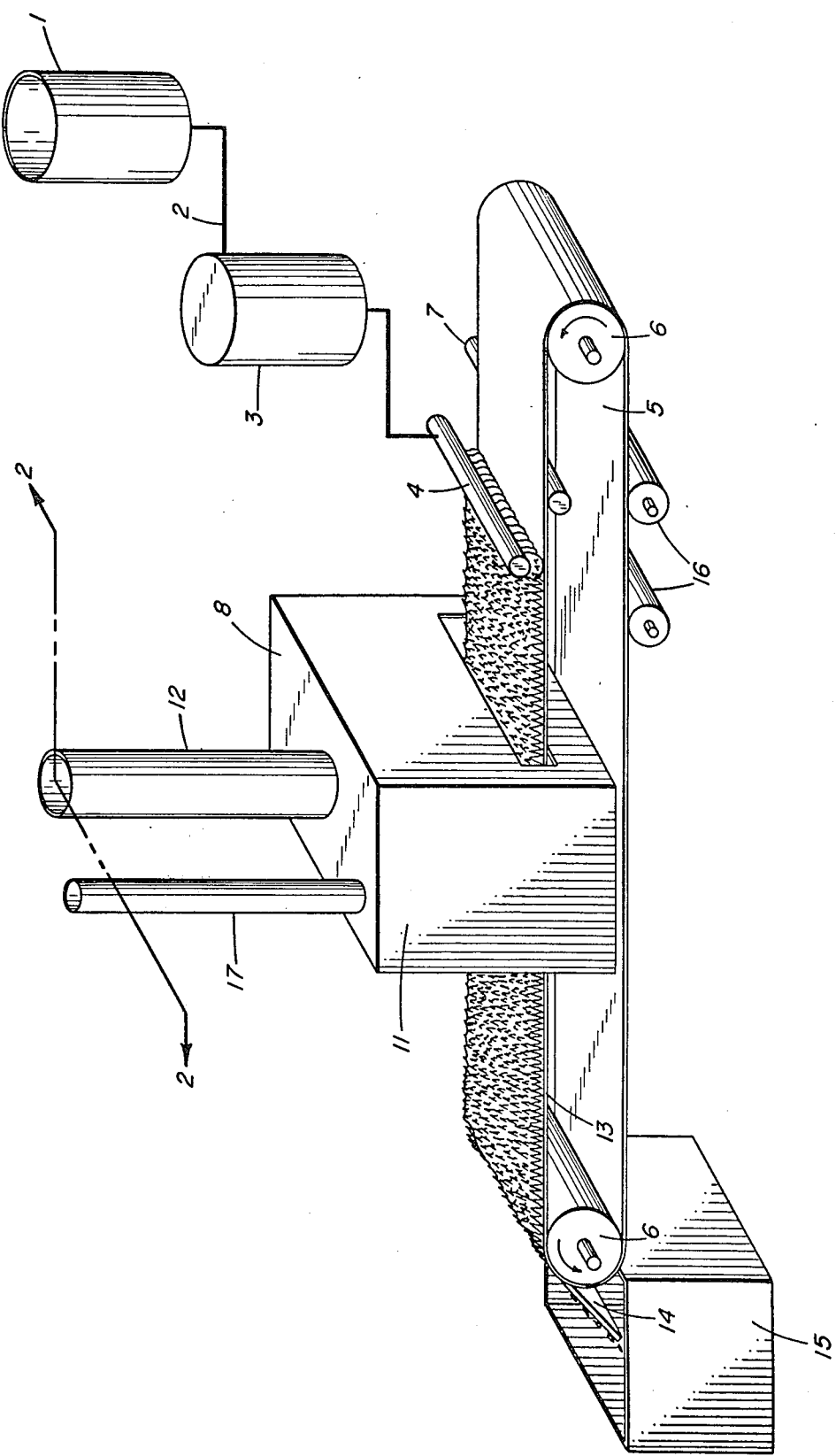
FIG. 1 is a flow sheet diagram illustrating the procedure of the present invention and apparatus useful in the carrying out of said procedure.

As mentioned above, this invention relates to a continuous process for the production of crystalline, water-insoluble ammonium polyphosphate which comprises
1. admixing either
   a. a phosphoric acid and a combined ammoniating and condensing agent at a ratio of from about 1.0 to about 3.0 moles of agent per mole of acid or
   b. urea phosphate and a combined ammoniating and condensing agent at a ratio of from about 0.5 to about 1.05 moles of agent per mole of phosphate,
2. heating the resultant admixture to from about 75° to about 90°C. to thereby form a melt,
3. contacting the resultant melt with a moving, endless belt which is preheated to a temperature of from about 150° to about 200°C. to foam said melt,
4. passing the belt having the said foam thereon through a heated zone to from about 180° to about 360°C. to cause ammonia to evolve from said foam,
5. removing said ammonia gas from said zone at a rate controlled by the measured desired pH of the resultant ammonium polyphosphate and
6. recovering the resultant crystalline, water-insoluble ammonium polyphosphate of controlled pH.

Any condensed phosphoric acid may be used in step (1) (a) of our novel process, however, we have found that the lower the acid strength (reflected by a lower $P_2O_5/H_2O$ ratio), the longer the reaction time required and the more undesirable nitrogen containing impurities are formed in the final product. We have found that condensed phosphoric acids having an acid strength of at least about 75% generally are useful in our novel process, with acid strengths ranging from about 85% to about 95% being preferred. The following table sets forth the particular $P_2O_5/H_2O$ mole ratios for various strengths of phosphoric acids useful herein.

| Phosphoric Acid Acid Strength | $P_2O_5/H_2O$ Mole Ratio |
|---|---|
| 75% | 0.155 |
| 85% | 0.200 |
| 95% | 0.289 |
| 100% | 0.328 |

With regard to the undesirable nitrogen based impurities which are produced as a result of using phosphoric acids of decreasing acid strength, the following table sets forth the chemical analyses of the resultant ammonium polyphosphates produced. The nitrogen impurities are detrimental in that the resultant ammonium polyphosphate, when utilized as a flame-retardant in the surface material of a wood particleboard, has a correspondingly reduced amount of effective flame-retarding phosphorus therein.

| Phosphoric Acid Strength | Total Nitrogen % | Ammonia Nitrogen % | Phosphorus % | Nitrogen Based Impurities % |
|---|---|---|---|---|
| 85% | 18.5 | 10.7 | 26.2 | 7.8 |
| 90% | 16.7 | 12.4 | 29.5 | 4.3 |
| 95% | 15.3 | 14.8 | 31.5 | 0.5 |

The combined ammoniating and condensing agent to phosphoric acid mole ratio, as indicated above, is critical in that the use of said materials within the above-specified range also contributes to the reduction of undesirable nitrogen based impurities and consequently an increased amount of flame-retarding phosphorus in the resultant ammonium polyphosphate. The above-specified range of mole ratio of agent to acid represents that amount of agent required to conduct the condensation reaction which is just sufficient to consume substantially all the water in the reaction system, i.e. the water present in the original charged acid and the water of dehydration of the acid to form the poly-acid. For example, using urea as the combined ammoniating and condensing agent and 85% phosphoric acid as the charge acid, the optimum ratio is 1.85 moles of urea for each mole of phosphoric acid. At 90% phosphoric acid, the ratio is 1.55/1.0, at 95% phosphoric acid, the ratio is 1.21/1.0 and, of course, at 100% the ratio is 1.0/1.0.

When conducting step (1) of our novel process utilizing alternative (b), no excess combined ammoniating and condensing agent is required, although, under practical conditions, the excess agent is limited to about 5.0% to minimize by-product formation and optimize pH.

The urea phosphate, step (1) (b), charged to the heated, moving belt according to our novel process is well known in the art as are methods for its preparation. In general, we have found that the urea phosphate can be produced by charging to any appropriate reaction vessel phosphoric acid and urea with stirring and under gentle heat until a clear solution is formed. The mixture is then cooled to form a crystalline salt of urea phosphate (addition compound) and is filtered. The recovered crystals are allowed to dry and ground to the desired mesh. The acid strength is not critical and can range from about 50 to about 85%, the amount of urea charged depending upon the acid strength used. Thus, 100 parts acid of specified strength requires so many parts of urea, i.e.

| Phosphoric Acid Acid Strength | Parts of Urea Required |
|---|---|
| 50% | 30.5 |
| 60% | 36.5 |
| 70% | 42.8 |
| 75% | 46.0 |
| 80% | 49.0 |
| 85% | 52.0 |

The combined condensing and ammoniating agents which may be used herein are well known in the art and include the nitrogeneous compounds containing one or more amide groups. Examples of suitable materials fit for this purpose include urea, ammonium carbamate, biuret, sulfamide, sulfamic acid, ammonium sulfamate, gaunyl urea, methyl urea, formamide, amino urea, 1,3-diamino urea, biurea and the like, urea per se being preferred because of its inexpensiveness and ready availability.

With reference to FIG. 1 of the accompanying drawing, the instant process is conducted in the following manner. The phosphoric acid-ammoniating/condensing agent or urea phosphate-ammoniating/condensing agent charge materials are admixed in mixing tank 1 at 75°–90°C. to thereby form a melt. The tank is continually agitated with a stirrer, not shown, in order to keep the components in continual contact. The melt is transported through conduct 2 and into feeding tank 3 equipped with dispensing means 4, which can be a nozzle, series of nozzles or any other means of equally dispensing the melt over a specific area.

Endless belt 5 is continually passed over motorized driving wheels 6 and the melt is dispensed thereon, the belt having been previously heated to 150°–200°C. by preheater 7 which can be any typical heating means such as a gas burner, infrared heater, etc. Upon contact with the preheated belt, the melt immediately begins to foam into a forthy layer which can be made of uniform depth in any manner such as by the use of a doctor blade, oscillating comb or the like, not shown. The depth of the foam may also be, and is preferably, controlled by the depth of the melt added to the belt by dispenser 4. The melt may be replaced by a solid charge in our process but such a feature is not preferred for economic reasons.

Figure 2:
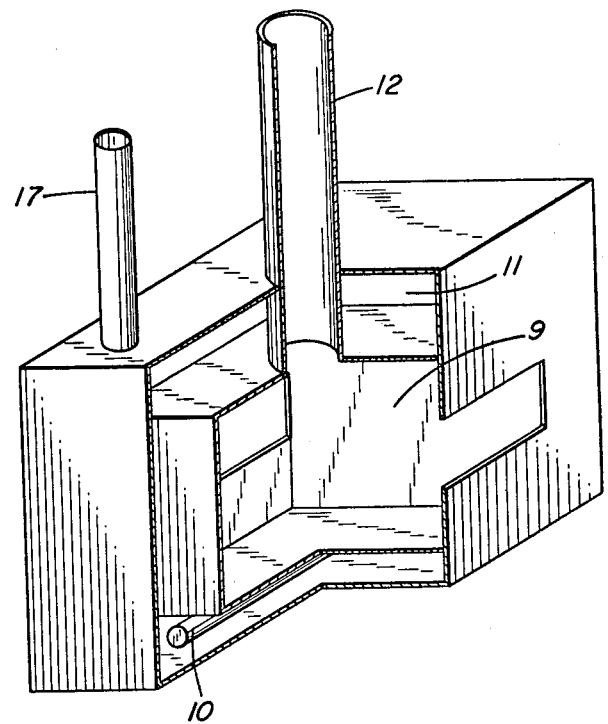
FIG. 2 is a cut-away view taken along line A—A of the reactor of FIG. 1 showing more detail of the reaction and heating zones.

The moving belt 5 containing the foam is then passed through reactor 8 containing reaction zone 9 (FIG. 2) wherein the foam is heated to 180°–360°C. by heater 10 (FIG. 2) which can be of the same or different type and configuration as heater 7. Reactor 8 is composed of two separated areas i.e. reaction zone 9 and heating zone 11, FIG. 2. Zone 11 is heated to within the above temperature range, and by radiation from zone 11, zone 8 is also so heated. It is critical that the foam layer be heated above and below the moving belt, since if it is not the foam will under go a reaction immediately upon contact with the heat and the reaction product, i.e. the ammonium polyphosphate which forms will insulate the remaining foam and a non-uniform product will result.

The residence time of the foam in the reaction zone of reactor 8 depends upon the thickness of the foam on the belt as it passes through the zone. It has generally been found that foams ranging in thickness from about 1 to about 6 inches result in the satisfactory production of ammonium polyphosphate if the residence time of the foam in the reaction zone ranges from about 15 seconds to about 3 hours, the thicker the foam the longer the residence time required.

While the above reaction zone temperature range of from about 180° to about 360°C. is applicable in all cases, especially when using urea phosphate, optimum temperatures of about 325°C. when using 85% phosphoric acid and about 355°C. when using 95% phosphoric acid are preferred. Temperatures lower than those best fit for ammonium polyphosphate production at any given acid strength of phosphoric acid tend to result in the formation of undesirable nitrogen based impurities while temperatures higher than 360°C., in any instance, cause decomposition of the resultant product.

As the foam slowly passes through reaction zone 9, ammonia gas evolves therefrom. This ammonia gas atmosphere is maintained over the reacting foam to thereby optimize the pH of the resultant ammonium polyphosphate in a manner more precisely described hereinbelow. Ammonia gas is vented from the reaction zone and areas immediate thereto through vent 12 and is removed from the system for recovery or discard.

The ammonium polyphosphate emerges from the reaction zone and is preferably cooled through contact with the atmosphere at cooling area 13. Cooling per se is, however, not necessary, since it merely aids in removal of the product from the belt. The cooled product is scraped from the endless belt by scraper 14 and is collected in zone 15. The belt is continually cleaned by brushes 16 so as to ready the surface thereof for the receipt of additional melt from tank 3. Combustion gases from zone 11 are removed via chimney 17.

As briefly discussed above, the crux of our novel process lies in the optimization of the pH of the ammonium polyphosphate by the manipulation and control of the ammonia gas atmosphere in reaction zone 9. This manipulation and control is accomplished by conducting the reaction in an atmosphere substantially devoid of any other gases than those resulting from the reaction itself. That is to say, since every mole of urea which is consumed results in the formation of 2 moles of ammonia and one mole of carbon dioxide, the amount of ammonia in the atmosphere above the ammonium polyphosphate being formed is known. By a continual measurement of the pH of the product being formed, it can be determined whether the ammonia in the atmosphere must be increased or decreased since the pH is too low if the ammonia in the atmosphere is too low. Therefore, by drawing off the ammonia at a controlled rate, the pH and solubility of the product can be optimized. Since all the heat in reaction zone 9 occurs by radiation from the heated zone 11, and the entire surface of the moving belt is heated, i.e. the top and bottom thereof, no combustion gases from the heaters are present in the reaction zone. This method of production allows for a precise control of the ammonia vapors, the partial pressure of which is at a minimum, i.e. half the total pressure in the reaction zone. Removal of the atmosphere above belt 5 in zone 9 can be accomplished in any known manner such as by utilizing a damper and fan combination, not shown, vent 12.

The following examples are set forth for purposes of illustration only and are not to be construed as limitations on the present invention except as set forth in the appended claims. All parts and percentages are by weight unless otherwise specified.

EXAMPLE 1

To a suitable mixing vessel are added 158.0 parts of urea phosphate and 3.0 parts of urea. The solid materials are thoroughly admixed and then heated to 80°C. to form a melt thereof. The melt is then discharged onto a moving, stainless steel belt which has been preheated to 175°C. at a belt loading rate of 0.2 pounds per cubic foot. The mixture begins to foam and is passed into a heating zone, which is heated to a temperature of 340°–360°C., at a belt speed of 12 feet per minute. The residence time of the foam in the heater is 40 seconds. The ammonia-carbon dioxide atmosphere in the heater (combustion gases are nil) is vented at a rate of 4500 cubic feet per hour and the resultant product is tested after 5 minutes of reaction to determine its pH. The pH is 2.5. The atmosphere vent off is then reduced to 2400 cubic feet per hour. After 5 minutes, the pH of the resultant, water-insoluble crystalline, ammonium polyphosphate is a steady 5.2.

EXAMPLE 2

The procedure of Example 1 is again followed except that the charge consists of 120.0 parts of urea and 115.0 parts of 85% phosphoric acid. The initial vent-off of atmosphere is conducted at 4500 cubic feet per hour and the pH is found to be 3.1. When the vent-off is adjusted to 2400 cubic feet per hour, the pH of the water-insoluble, crystalline ammonium polyphosphate steadies at 5.5.

EXAMPLE 3

The procedure of Example 1 is again followed except that the charge consists of 63.0 parts of urea and 98.0 parts of 100% phosphoric acid. An excellent product having a pH of 5.2 is recovered at an atmosphere vent-off rate of 2400 cubic feet per hour.

EXAMPLE 4

Again following the procedure of Example 1 except that the charge materials comprise 162.0 parts of urea and 100.0 parts of 75% phosphoric acid, the belt speed is 6 feet per minute and the residence time is 80 seconds, ammonium polyphosphate is recovered having a pH of 5.0 at an atmosphere venting rate of 5000 cubic feet per hour. The pH of the first sample of product at an atmosphere vent-off rate of 8300 cubic feet per hour was 3.5.

We claim:
1. A continuous process for the production of crystalline, water-insoluble ammonium polyphosphate of a pH ranging from about 4.5–6.5 which comprises
   (1) admixing either
      a. a condensed phosphoric acid of $P_2O_5/H_2O$ mole ratio of at least about 0.155 and a combined ammoniating and condensing agent at a mole ratio of about 1.0–3.0 moles of agent per mole of acid, or
      b. urea phosphate and a combined ammoniating and condensing agent at a ratio of about 0.5–1.05 moles of agent per mole of phosphate,

2. heating the resultant admixture to from about 75°–90°C. to form a melt,
3. contacting the resultant melt with a clean endless moving belt which is preheated to a temperature of from about 150°–200°C. to immediately foam the melt,
4. passing the belt having the resultant foam thereon through a zone heated to from about 180° to about 360°C. to cause ammonia gas to evolve therefrom,
5. venting off said ammonia gas at a rate controlled by the measured pH of the resultant ammonium polyphosphate and
6. recovering the resultant crystalline, water-insoluble ammonium polyphosphate of the above pH.

2. A process according to claim 1 wherein step (1) comprises admixing a condensed phosphoric acid and a combined ammoniating and condensing agent.

3. A process according to claim 1 wherein step (1) comprises admixing urea phosphate and a combined ammoniating and condensing agent.

4. A process according to claim 1 wherein said ammonium polyphosphate is cooled before recovery.

* * * * *